United States Patent [19]

van der Molen et al.

[11] 3,976,631

[45] Aug. 24, 1976

[54] PROCESS FOR PREPARING ETHYLENE POLYMERS

[75] Inventors: Theodorus J. van der Molen, Geleen; Louis A. Meijer, Stein; Joos D. Joosen, Geleen, all of Netherlands

[73] Assignee: Stamicarbon B.V., Geleen, Netherlands

[22] Filed: Apr. 18, 1974

[21] Appl. No.: 462,074

[30] Foreign Application Priority Data
Apr. 18, 1973 Netherlands.................. 7305415

[52] U.S. Cl.................. 526/64; 264/205; 526/65; 526/68; 526/317; 526/329; 526/331; 526/350; 526/352; 526/73
[51] Int. Cl.² ...................... C08F 110/02
[58] Field of Search ............. 264/205, 176 F; 260/44.9 GD, 44.9 P, 44.9 F, 44.9 R

[56] References Cited
UNITED STATES PATENTS

| | | | |
|---|---|---|---|
| 2,728,753 | 12/1955 | Russum et al. | 260/94.9 F |
| 2,831,845 | 4/1958 | Biddle et al. | 260/94.9 P |
| 3,032,545 | 5/1962 | Renberg | 260/94.1 |
| 3,050,113 | 8/1962 | Rundquist | 159/DIG. 10 |
| 3,227,794 | 1/1966 | Anderson et al. | 264/205 |
| 3,306,342 | 2/1967 | Salvo et al. | 159/47 R |
| 3,373,235 | 3/1968 | Rice | 264/143 |
| 3,461,193 | 8/1969 | Gilardi | 264/205 |
| 3,703,502 | 11/1972 | Venderbos et al. | 260/94.9 F |
| 3,719,648 | 3/1973 | Frielenk | 264/143 |
| 3,740,383 | 6/1973 | Gabellieri et al. | 260/88.2 |
| 3,784,538 | 1/1974 | Pfannmueller et al. | 260/94.9 P |
| 3,883,630 | 5/1975 | Raganato | 264/204 |
| 3,885,014 | 5/1975 | Fukada et al. | 264/176 F |
| 3,902,957 | 9/1975 | Kozlowski | 162/157 R |

FOREIGN PATENTS OR APPLICATIONS
46-39483  11/1971  Japan.................. 264/205

Primary Examiner—Jay H. Woo
Attorney, Agent, or Firm—Cushman, Darby & Cushman

[57] ABSTRACT

In a process for preparing homo- or co-polymer of ethylene, in which ethylene alone or mixed with one or more other unsaturated organic compounds capable of forming a copolymer with ethylene is subjected to a high pressure and a high temperature in a reactor in the presence of an initiator or a catalyst, in which the mixture of polymer and unconverted monomer discharged out of the reactor is expanded to, practically, atmospheric pressure with the aid of an expansion device in two or more steps, and in which the polymer present in the expanded mixture is separated from the mixture in the solid state, the improvement which comprises obtaining the polymer in a fibrous form by supplying the mixture to the last stage of the expansion device at such a pressure and temperature that, during the expansion, in this last stage, the polymer passes from the liquid phase to the solid phase.

10 Claims, 3 Drawing Figures

PROCESS FOR PREPARING ETHYLENE POLYMERS

BACKGROUND OF THE INVENTION

The invention relates to a process for preparing homo- or co-polymers of ethylene, in which ethylene alone or mixed with one or more other unsaturated organic compounds capable of forming a copolymer with ethylene, is subjected to a high pressure and a high temperature in a reactor in the presence of an initiator or a catalyst, in which the mixture of polymer and uncoverted monomer discharged out of the reactpr is expanded to, essentially atmospheric pressure with the aid of an expansion device in two or more steps, and in which the polymer present in the expanded mixture is separated from the mixture in the solid state.

A process of this kind is known from the U.S. Pat. No. 2,831,845 and 3,719,648, the disclosures of which are incorporated herein by reference. In these known processes the mixture discharged out of the reactor is so expanded that a mist of fine polymer droplets forms in the ethylene, which droplets are rapidly cooled by water or cold ethylene, so that a powdery polymer is obtained.

It has now been found that under certain conditions a fibrous polymer is obtained which is suitable for the manufacture of sheets, fleeces and similar non-woven products under either wet or dry processing conditions, or for use as a binding agent in the manufacture of non-woven products from natural or synthetic fibers.

DESCRIPTION OF THE INVENTION

According to the present invention an ethylene polymer with a fibrous structure is obtained by supplying the mixture at such a pressure and temperature to the last stage of the expansion device that during the expansion in said last stage the polymer passes from the liquid to the solid phase. Preferably, the conditions under which the mixture is supplied to the last stage of the expansion device are chosen such that the enthalpy of the monomer is 145–210 kcal/kg higher than the enthalpy of liquid ethylene at the boiling point of ethylene at a pressure of 1 kg/cm$^2$.

The enthalpy of ethylene at a given pressure and temperature can be determined in a simple way with the aid of the Mollier diagram published by H. Benzler and A. v. Koch in Chemie-Ing. Technik 27, pages 72, 73 (1955), the disclosure of which is incorporated herein by reference. In this diagram the enthalpy of liquid ethylene at the boiling point of ethylene at a pressure of 1 kg/cm$^2$ has been taken as the zero point. Below, the difference between the enthalpy of ethylene under certain conditions and the enthalpy under the conditions prevailing at said zero point will be indicated as the enthalpy of the ethylene.

The diagram referred to above shows that the temperature of ethylene, at adiabatic expansion of a pressure above about 700 kg/cm$_2$ to the atomspheric pressure, increases initially and, subsequently, decreases again. The specific volume increases only little initially, but to an even higher degree upon further expansion. As a result of this, also the velocity of the ethylene flowing in the expansion device becomes higher and higher.

At a certain value of the enthalpy the polymer particles will be in the liquid state during the time that the movement is highly accelerated during the expansion of the ethylene, so that the polymer droplets adopt an elongated shape. If now this value is so chosen that the temperature of the mixture leaving the expansion device has dropped to below the crystallization temperature of the polymer, said shape will become fixed, so that the polymer is separated off in the form of fibers.

The limits within which formation of fibers occurs depend on the crystallization temperature of the polymer. It has been found that in case of low-density polyethyelene having a specific gravity of less than 0.93 and whose melting point amounts to 106°–114°C according to the determination with the aid of the melting-point microscope, formation of fibres occurs between the enthalpy values of 145 and 200 kcal/kg. In case of high-density polyethylene having a specific gravity of about 0.96 and a melting point of about 130°C these limits are slightly higher, viz. 150 and 210 kcal/kg respectively. For copolymers of ethylene containing at least 90 mol.-% of ethylene the limits are practically equal to those of the low-density polyethylene.

If between the polymerization reactor and the last expansion stage no heat is exchanged with the surrounding, the expansion will be adiabatic. In this case the enthalpy is constant, so that for the preparation of fibres it will suffice to choose such reaction conditions that the enthalpy of the ethylene in the reactor has the desired value. If the enthalpy in the reactor should be in excess of the upper limiting value for obtaining a fibrous product, the mixture leaving the reactor may be subjected to external cooling before or during the expansion in order for the enthalpy to be brought at the desired value.

Of course, at the limiting values there will be no sudden changeover from fibrous to powdery polymer, but fibres with a smaller length to diameter ratio or mixtures of fibres and powder are obtained. Further, the melt index of the polymer influences the composition of the product in the limiting areas, in that a polymer having a high melt index, and hence a low viscosity, will have a more distinct fibrous character in the lower limiting area than will a polymer with a low melt index. In the upper limiting areas it is the very polymers with a low melt index which will have a better tendency to form fibers than will polymers with a high melt index.

The most favorable results are obtained with expansion of an ethylene-polymer mixture whose ethylene has an enthalpy of 180-190 kcal/kg. In this case products are obtained which for the greater part consist of polymer fibers, independent of the melting point or the melt index of the polymer.

The first stage of the expansion device normally consists of a valve which is so operated that the pressure in the reactor is kept at the desired value. The pressure drop across this valve is great, but the increase in volume of the ethylene rather small since the expansion takes place in a high-pressure area. The expansion in the last stage is preferably carried out in a narrow, tubular expansion channel. The increase in volume of the ethylene in the last stage is substantially large, so that the velocity and the acceleration of the ethylene flowing in this narrow channel are also large, which promotes formation of polymer fibers and prevents the expansion channel from getting plugged.

Since the fibres leaving the expansion device may still be sticky to a greater or lesser extent, they are preferably quenched with the aid of a cold medium in order to prevent their sticking together or their sticking to the wall of the collecting device. If water is used for quenching the fibers, the resulting pulp, possibly mixed with other fibrous material, like cellulose, can be directly processed to sheets of fleeces employing a conventional wet technique such as is used for the manufacture of paper. In case the fibers are quenched with a cold gas, they may also be processed to fibrous fleeces in a known way according to a dry processing technique, possibly mixed with other natural or synthetic fibres.

DESCRIPTION OF THE DRAWINGS

The invention will be elucidated in more detail with the aid of the example for realization shown in the drawing.

Referring to FIG. 1, with the aid of compressors 1 ethylene is brought at the desired reaction pressure, for instance 2000 kg/cm$^2$, and led, via a line 2, into a reactor 3 which reactor 3 may be an autoclave or a tubular reactor. If desired, other monomers, capable of forming a copolymer with the ethylene, may be added to the ethylene. Examples of such commonomers are unsaturated esters, like ethyl acrylate, vinyl acetate or vinyl propionate, unsaturated carboxylic acids, such as acrylic acid, methacrylic acid, etc., alkenic compounds, like propylene and neo-hexylene, and other unsaturated compounds, such as acrylonitrile and vinyl choloride. Through a line 4 an initiator, like oxygen, a peroxide, for instance diethyl peroxide, di-tertiary butyl peroxide, lauroyl peroxide, capryloyl peroxide, tertiary butylperbenzoate, etc., or compounds of the azo-type, azines and oximes, is/are passed into the reactor. In this case low-density polythylene having a specific gravity of about 0.92–0.93 is prepared. It is also possible for the polymerization to be carried out in the presence of coordination catalysts as are applied in the low-pressure polymerization of α-olefins, in which case polyethylene with a specific gravity of approximately 0.96 and a melting point of about 130°C is obtained. Also mixtures of different initiators may be applied and these initiators may be separately led into the reactor in a number of places, the type of the initiator applied being adapted to the temperature of the reactor contents at the feeding point.

Figure 1:
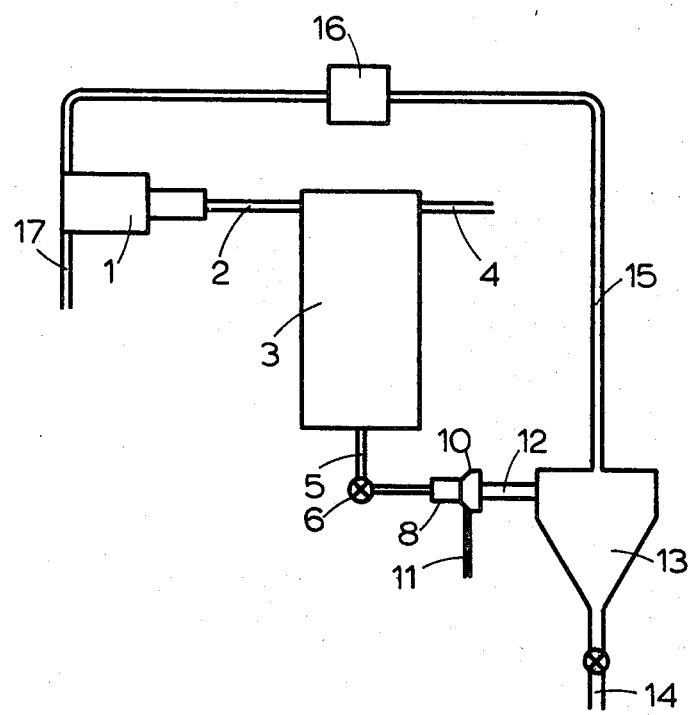
FIG. 1 is a schematic view of apparatus for carrying out the process of the present invention.

The initiators may be supplied as a suspension in a diluent or in the form of a solution. The quantity is small and amounts, for instance, of 0.001 to 3 % by weight referred to the total amount of material are supplied to the reactor. Depending on the initiator applied and the required properties of the product, the reaction temperature may range from between 100° and 400°C.

Further, agent controlling the molecular weight, such as hydrogen, saturated hydrocarbons, like propane, butane, isobutane, pentane, etc., may be supplied in the reactor, in a quantity of 0.5 to about 10% by weight of the ethylene, dependent on the desired melt index of the polymer.

The heat liberated during the polymerization is discharged by continuously discharging a quantity of unconverted monomer, along with the polymer formed, out of the reactor and replacing cold monomer and, further, in the case of tubular reactors, by a cooling liquid flowing through a cooling jacket installed around the reactor tube. The conversion of ethylene into polyethylene as a rule amounts to 12 to approximately 20%, depending on the temperature difference between the inlet and the outlet of the reactor and the heat discharge through the reactor wall. The polymer formed in the reactor 3 is discharged out of the reactor, together with the uncoverted monomer, via a line 5. In this line an expansion valve 6 is installed, with the aid of which the pressure in the reactor is kept at the desired value. Following this first expansion stage, the mixture flows into a chamber 7, the pressure being strongly reduced and expanding subsequently essentially to atmospheric pressure in a throttling device 8, which is equipped with a narrow passage channel 9. The pressure in chamber 7 depends on the dimensions of the passage channel 9 and on the velocity and the viscosity of the mixture flowing through this channel. This pressure should have such a value that the polymer is in the liquid state at the temperature corresponding with this pressure and that the degree of expansion in channel 9 is large enough to obtain the required formation of fibres. Dependent on the reaction conditions, the capacity of the device and the properties of the polymer formed, the pressure in the chamber 7 may be set between, for instance, 10 and 500 kg/cm$^2$. Said setting may be effected by the installation of a throttling device 8 whose passage channel 9 has suitable dimensions. To this end, the throttling device 8 is so installed as to be exchangeable. The choice of the proper throttling device can be made in a simple way by one skilled in the art, by experiments or by calculation.

The passage channel 9 terminates in a mixing head 10, to which a cooling medium, for instance water, is fed through the channels 11. It is also possible, however, for the mixture leaving the expansion device 8 to be cooled with cold ethylene in the way described in U.S. Pat. No. 3,719,648.

If the temperature and the pressure of the mixture supplied are so chosen that the enthalpy of the ethylene upon entry into the tubular expansion channel lies between 145 and 210 kcal/kg, mainly fibrous polymer particles are obtained. If the temperature and the pressure of the mixture leaving the reactor are not such that this condition is satisfied, a heat-exchanger may be installed between the reactor and the last expansion stage, with the aid of which exchanger the temperature of the mixture is so changed that the condition made is yet satisfied.

The mixture of gaseous monomer, polymer fibres and water flows through a line 12 into a vessel 13, in which an aqueous pulp of polymer fibres is separated off and discharged via a line 14. The monomer leaves the vessel 13 through a line 15 and is returned to the inlet of the compressor 1 via a cleaning device 16 for separation of low-molecular products and solvents for the initiator. Further, fresh monomer is supplied to the compressor 1 through a line 17 in a quantity corresponding with the quantity of monomer converted into polymer.

EXAMPLES

Figure 2:
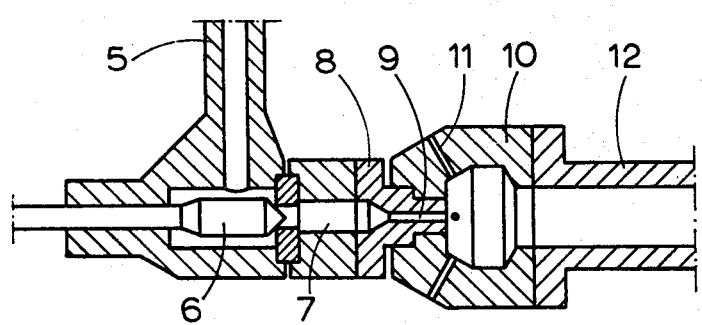
FIG. 2 is a longitudinal section, on an enlarged scale, of the expansion device of FIG. 1.

Ethylene was polymerized in a test reactor at pressures of between 1000 and 1900 kg/cm$^2$ and temperatures of between 130° and 250°C, to be subsequently expanded to atmospheric pressure in an expansion device according to FIG. 2.

For initiator (catalyst) the following substances were used:
A: di-tertiary butyl peroxide,
B: capryoyl peroxide,
C: tertiary butyl perbenzoate,
D: di-cyclohexylperoxydicarbonate,
E: di-tertiary butyl-4-cyclohexylperoxydicarbonate,
F: catalyst consisting of a mixture of di-ethylaluminiumchloride, di-butyl-magnesium and TiCl₄, or
G: catalyst as under F, in which the TiCl₄ component had been replaced by tetrabutoxytitanium.

The polymer separated off from the reaction product after the expansion was examined both macroscopically and microscopically. At a length to diameter ratio of the polymer particles in excess of 50, these particles were qualified as fibres and at a smaller ratio as granules. The whole product was qualified as consisting of fibres if, after screening off, less than 40% by weight of granules were present. When the granule content amount to more than 60% by weight, the product was considered to be granular. The results of the tests are given in the table, in which V and K respectively indicate whether a fibrous or a granular product has been obtained. Mixed shapes, in which 40–60% by weight consisted of fibers, are indicated by K/V.

The enthalpy values mentioned in the table were determined with the aid of the Mollier diagram of Benzler and Koch. The line connecting the reactor with the expansion device and the expansion device itself were insulated, so that the expansion was adiabatic and the enthalpy of the ethylene in the last stage of the expansion device equal to the enthalpy of the ethylene in the reactor.

Table

| test no. | pressure kg/cm² | temp. °C | enthalpy kcal/kg | initiator | melt index | product |
|---|---|---|---|---|---|---|
| 1 | 1900 | 190 | 220 | B | 0.2 | K |
| 2 | 1900 | 180 | 216 | E | 0.1 | K |
| 3 | 1900 | 180 | 216 | C | 1.5 | K |
| 4 | 1900 | 145 | 190 | D | 1.0 | V |
| 5 | 1900 | 140 | 189 | D | 0.6 | V |
| 6 | 1900 | 135 | 187 | D | 0.01 | V |
| 7 | 1875 | 205 | 230 | G | 3 | K |
| 8 | 1800 | 195 | 222 | B | 0.001 | K |
| 9 | 1750 | 175 | 208 | F | 2 | V |
| 10 | 1600 | 170 | 200 | B | 6 | K/V |
| 11 | 1600 | 155 | 190 | B | 0.5 | V |
| 12 | 1500 | 145 | 183 | D | 1.1 | V |
| 13 | 1380 | 195 | 210 | B | 0.35 | K |
| 14 | 1380 | 145 | 178 | D | 1.4 | V |
| 15 | 1300 | 180 | 200 | B | 0.001 | V |
| 16 | 1280 | 145 | 176 | D | 0.01 | V |
| 17 | 1100 | 145 | 172 | D | 1.0 | K/V |
| 18 | 1000 | 250 | 260 | A | 310 | K |
| 19 | 1000 | 90 | 137 | D | 0.1 | K |
| 20 | 900 | 145 | 168 | D | 11 | V |
| 21 | 800 | 145 | 166 | D | 36 | V |

In these tests, with the exception of the tests 5 and 6, a homopolymer of ethylene was prepared. The specific gravity of these homopolymers amounted to 0.92–0.93, except in the tests 7 and 9 when a high-density polyethylene with a specific gravity of 0.960 and 0.961, respectively, was prepared by application of a coordination catalyst. For the agent controlling the molecular weight, a small amount of hydrogen was led into the reactor in the tests 7 and 9, and a small quantity of propane in the other tests. By variation of these quantities, products with different melt indices were obtained. In test 5 a copolymer of ethylene with vinyl acetate was prepared with incorporation of vinyl acetate to 17.7% by weight, and in test 6 a copolymer of ethylene with acrylamide, with incorporation of acrylamide to 11.5% by weight.

The table shows that at an enthalpy of less than 200 kcal/kg a fibrous product was obtained. At a higher enthalpy, the polymer separated off was predominately powdery, except in the case of high-density polyethylene when, also at enthalpy values of up to 210 kcal/kg, fibrous polymer was still obtained. At enthalpy values of less than 145 kcal/kg (test 19) also a granular product was separated off. In the limiting areas mixed shapes occur, in which the melt index of the polymer affects the fibers to powder ratio.

Figure 3:
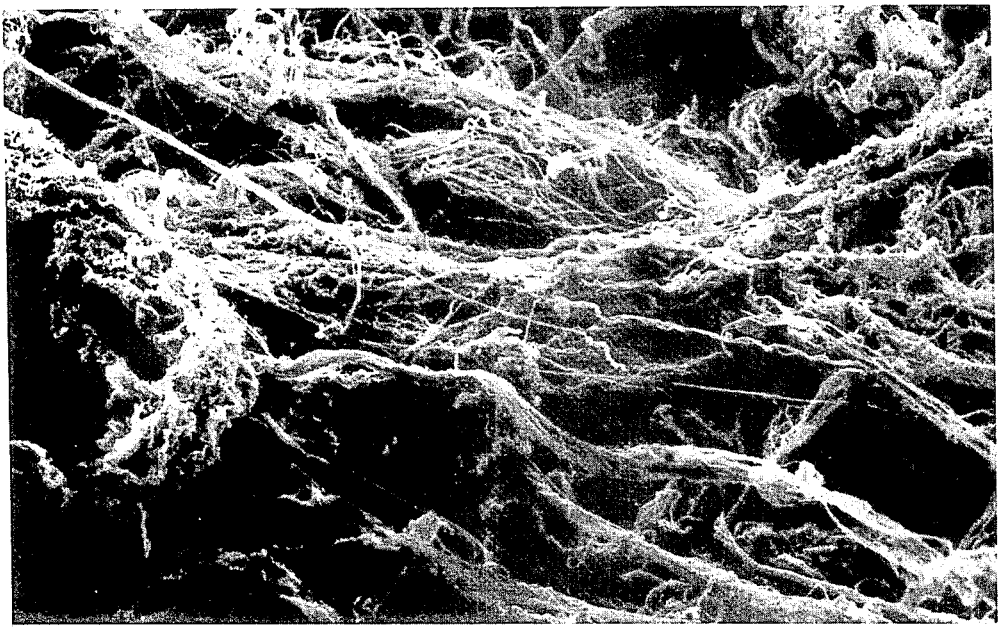
FIG. 3 is a photograph on an enlarged scale of fibres obtained according to the invention.

FIG. 3 is a photograph (enlargement 180 ×) of the fibrous product obtained with test 16. The filaments of this product have a diameter of a few $\mu$ and a length of a few mm up to a few cm. The product has the appearance of wadding and may be processed to a sheet by the wet or the dry method. The fibres may also be mixed with natural fibres or with fibers of another polymer, like polyamide, poylester, polypropylene, or polyacrylonitrile, and act as a binding agent by heating the formed fleece under pressure to above the melting point of the polyethlene.

The advantage of the process described in comparison with known processes, in which fibres are prepared from a polymer solution, is that the fibers are free from solvents or other substances which are to be removed before the fibers can be subjected to further processing.

We claim:
1. In a process for preparing homopolymers or copolymers of ethylene wherein ethylene or a mixture of ethylene with at least one other organic compound capable of forming a copolymer with ethylene is subjected to a high pressure and a high temperature in a reactor in the presence of an initiator or catalyst, in which the mixture of polymer and unconverted monomer discharged out of the reactor is expanded to practically atmospheric pressure with the aid of an expansion device in at least two steps whereby the polymer in the expanded mixture is separated from the mixture in the solid state, the improvement which comprises supplying the mixture to the last stage of the expansion device at a pressure and temperature between 130° and 250°C such that the enthalpy of the unconverted ethylene monomer in the mixture supplied to the last stage of the device is from 145 to 210 kcal/kg higher than the enthalpy of liquid ethylene at the boiling point of ethylene at a pressure of 1 kg/cm², whereby during expansion in the last stage of the expansion device the polymer passes from the liquid phase to the solid phase in fibrous form.

2. A process as in claim 1 wherein the enthalpy of the unconverted ethylene monomer is 180–190 kcal/kg higher than the enthalpy of liquid ethylene at a boiling point of ethylene at a pressrue of 1 kg/cm².

3. A process as in claim 1 wherein the expansion of the mixture from reaction conditions to atmospheric pressure is adiabatic and wherein the reaction conditions are such that the enthalpy of the unconverted ethylene monomer in the mixture discharged out of the reactor is 145–210 kcal/kg higher than the enthalpy of liquid ethylene at the boiling point of ethylene at a pressure of 1 kg/cm².

4. A process as in claim 3 wherein the enthalpy is 180–190 kcal/kg.

5. A process as in claim 1 wherein the mixture is first expanded in a valve controlling the pressure in the reactor and is subsequently expanded to the final pressure in a tubular expansion channel.

6. A process as in claim 1 wherein the pressure before the last expansion stage is 10–500 kg/cm$^2$.

7. A process according to claim 1 wherein said polymer comprises low-density polyethylene having a specific gravity of less than 0.93 and whose melting point ranges from 106°–144°C and the enthalpy values are between 145 and 200 kcal/kg.

8. A process according to claim 1 wherein said polymer comprises high-density polyethylene having a specific gravity of about 0.96, and a melting of about 130°C and the enthalpy values are between 150 and 210 kcal/kg.

9. A process according to claim 1 wherein said copolymers contain at least 90 mole percent ethylene and the enthalpy values are between 145 and 200 kcal/kg.

10. A process according to claim 1 wherein said ethylene is subjected to a pressure of at least 700 kg/cm$^2$ in said reactor.

* * * * *